United States Patent [19]
Jaskulke et al.

[11] 4,031,375
[45] June 21, 1977

[54] ARRANGEMENT FOR FAULT DIAGNOSIS IN THE COMMUNICATION CONTROLLER OF A PROGRAM CONTROLLED DATA SWITCHING SYSTEM

[75] Inventors: Gerhard Jaskulke, Dachau; Alois Schwarz, Munich; Armin Rutter, Unterpfaffenhofen, all of Germany

[73] Assignee: Siemens Aktiengesellschaft, Munich, Germany

[22] Filed: Mar. 15, 1976

[21] Appl. No.: 666,583

Related U.S. Application Data

[63] Continuation of Ser. No. 501,463, Aug. 28, 1974, abandoned.

[30] Foreign Application Priority Data

Aug. 29, 1973 Germany .......................... 2343586

[52] U.S. Cl. ...................... 235/153 AK; 179/18 ES
[51] Int. Cl.² ......................................... G06F 11/04
[58] Field of Search .......................... 235/153 AK; 340/146.1 BE, 172.5; 179/18 ES, 175.2 C, 175.2 R

[56] References Cited

UNITED STATES PATENTS

| | | | |
|---|---|---|---|
| 3,409,877 | 11/1968 | Alterman et al. ............. | 179/18 ES |
| 3,557,315 | 1/1971 | Kobus et al. .................... | 179/18 ES |
| 3,775,566 | 11/1973 | Akimaru et al. ................ | 179/18 ES |
| 3,783,255 | 1/1974 | Buedel et al. ................. | 235/153 AK |
| 3,794,973 | 2/1974 | Huber et al. ................. | 179/175.2 C |
| 3,806,887 | 4/1974 | Schulte ........................... | 340/172.5 |
| 3,818,199 | 6/1974 | Grossman et al. .......... | 235/153 AK |
| 3,820,085 | 6/1974 | Zelinski .......................... | 340/172.5 |

*Primary Examiner*—Charles E. Atkinson
*Attorney, Agent, or Firm*—Gerald L. Lett

[57] ABSTRACT

Apparatus is described for monitoring and diagnosing faults in the communication controller of a line termination unit in a program controlled data switching system. Individual devices detect faults and emit fault signals using safeguarding programs for the fault diagnosis. The communication controllers each contain a fault collection device which receives the individual fault signals and forms a fault word therefrom which describes the fault. Further, fault reaction signals are formed. A diagnosis routine device evaluates a diagnosis command read out from the diagnosis zone of a central storage unit. The diagnosis routine device contains a first decoding circuit for decoding the operations portion of the diagnosis command and for forming control signals therefrom. The control signals cause data channels to be switched through between the word output register and the word input register, as well as between a fault word register containing the fault word in the fault collection device and an intermediate buffer store. A second decoding circuit in the diagnosis routine device is activated by an additional control signal for producing a second series of control signals by evaluating a command of the diagnosis command. The control circuits and registers of the communication controller are connectable to the word input register under the control of the second control signals for the transfer of the diagnosis command.

7 Claims, 7 Drawing Figures

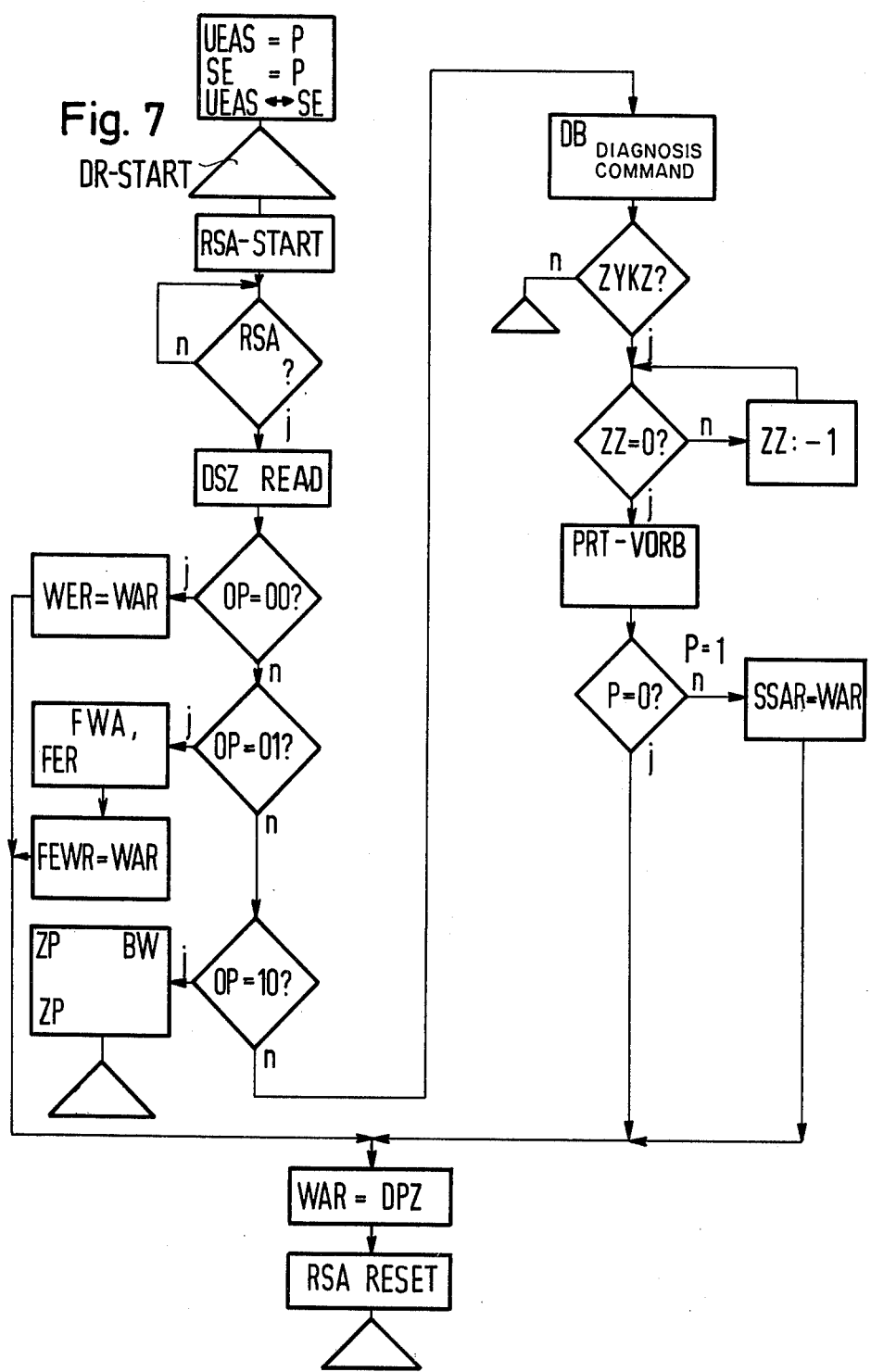

ARRANGEMENT FOR FAULT DIAGNOSIS IN THE COMMUNICATION CONTROLLER OF A PROGRAM CONTROLLED DATA SWITCHING SYSTEM

This is a continuation of application Ser. No. 501,463, filed Aug. 28, 1974 now abandoned.

BACKGROUND OF THE INVENTION

The invention relates to an arrangement for monitoring and fault diagnosis in the communication controller of a line termination unit in program controlled data switching systems of modular construction, with individual devices for the detection of faults and for the emission of fault signals, in which safeguarding programs take place for purposes of fault diagnosis.

In a program controlled data switching system, the incoming and outgoing lines are connected to a processing unit. This processing unit, which is referred to as line termination unit in the following, enables cyclic traffic with the central units of the system. The fundamental component of the central unit is the central storage unit which contains all the items of information required for the execution of switching functions and for the execution of safeguarding processes.

The line termination unit, which serves as link between the incoming and outgoing lines and the central components of the exchange, contains connection circuits which are assigned to the lines, input and output code converters which identify the connection circuits, and at least one communication controller which handles the data traffic between the line termination unit and the central parts of the exchange.

The construction of a line termination unit is described in detail in U.S. Pat. No. 3,717,723 in respect of the connection circuits and the input-output code converters. Therefore, only the essential features of the mode of operation will be described hereinbelow.

If an item of information, e.g., in the form of a polarity change, arrives on one of the connected lines, a cycle request is produced in the connection circuit assigned to this line. At the same time, the connection circuit which is offering the request is identified with the aid of the input code converter. The transfer of the cycle request to the central storage unit is carried out in the communication controller. With the aid of the address of the connection circuit which has been determined in the input code converter and has been coded accordingly, a specific feeder cell in the central storage unit which is permanently assigned to this connection circuit is accessed. This cell contains all the further items of information required to handle the item of information which has arrived. For example, as a result of the read out of the feeder cell, the address of a specific connection circuit is produced with which this connection circuit is identified by the output code converter. The line connected to this connection circuit is then given the information, in the present example, the new polarity change.

If, however, this is a connection which has not yet been switched through, on the arrival of an item of information on an incoming terminal, a series of programs are started which lead to the incoming item of information being evaluated as a call criterion and the appropriate switching reactions taking place. This is carried out under the control of specific programs, the execution of which leads to the prompt production and transmission of items of information and to the prompt evaluation of received items of information.

From U.S. Pat. No. 3,768,079 it is known to write into the feeder cells, in program controlled fashion, criteria which are read out by the communication controller of the line termination unit during a cycle relating to the feeder cell, and are evaluated for the handling of the arrived information. In this way it can be very rapidly established whether the incoming item of information is to be passed on to an outgoing connection circuit or whether it is to be entered in specific storage zones of the central storage unit. Such a storage zone is for example the so-called note pad store which is processed in specific time intervals by a program control unit.

From this patent it is also known to enter commands into another storage zone of the central storage unit under the control of the program control unit. This storage zone, the so-called command block store, is processed at specific intervals of time by the communication controller. The commands which are thereby read out can in turn be entered, together with an indication of the time of their execution, as so-called prompting commands in the notepad store. This in itself achieves a significant improvement in respect of the extreme real time requirements.

In this connection, commonly assigned U.S. application Ser. No. 552,796, filed Feb. 25, 1975, and now abandoned, which is a continuation of U.S. application Ser. No. 470,086, filed May 15, 1974, which is a continuation of U.S. application Ser. No. 265,654, filed June 23, 1972 discloses a further measure which consists in that at least those items of information which are offered for addressing purposes to the central storage unit, are intermediately stored in the communication controller. To this end one uses a so-called cycle buffer store. After the output of the information contained in the addressed storage zone, this information is checked in an evaluator circuit. In dependence upon the evaluation of the output stored data, it is established whether the cycle which has just been carried out is to be followed by further cycles, i.e., whether any further treatment is necessary or not. If it is established that the item of information, on the basis of which this first cycle has been carried out, need only be passed on to a specific connection circuit, no further cycles are required. If, however, it is established that a further cycle is in fact needed, the essential data required for this purpose are available in the cycle buffer store. In this case the intermediately stored data are transferred into a second buffer of the communication controller, the so-called subsidiary cycle buffer store, from which they are available for any additional cycle, if required. For this purpose, the subsidiary cycle buffer store (emits a cycle request in the known manner. The items of data contained in the subsidiary cycle buffer store are offered by the output registers of the communication controller to the store, and again to the cycle buffer store. This process can then be repeated if the read out stored data again require a subsequent processing of this information.

A most essential requirement for a program controlled data exchange is that of constant availability. By employing a generally known principle, the availability is increased by means of a modular construction. A further measure to improve the availability consists in introducing determinate function states for the individual units of the system. A proposal to set the individual system components into an operating state, a test state and a breakdown state, is described in U.S. Pat. No. 3,818,199. For this purpose the individual system components contain devices, for example, comparator devices of fault recognition circuits. The introduction of these states permits, by suitable safeguarding programs, the localization and diagnosis of faulty units, with the cooperation of fault-free parts of the system without these fault-free parts being affected by the faulty unit.

When applied to the line termination unit, these principles mean that the communication controller is provided at least twice, and that both communication controllers operate in parallel and in synchronism. Thus, it is possible to detect a faulty operation by means of comparator circuits, so that it is possible, when one communication controller is operating defectively, to maintain the operation without limitation by the other correctly functioning communication controller.

In FIG. 1 a system is illustrated in which the line termination unit LE contains two communication controllers UEAS1 and UEAS2 which are of identical construction, operate in parallel and cooperate with two storage units SE1 and SE2 which are likewise of identical construction.

Each of the two communication controllers UEAS1 and UEAS2 contains data input and data output devices DE and DA to which are connected the input and output code converters ECW and ACW. In the direction to the storage units SE1 and SE2 are arranged the registers SSAR, AdAR and WAR. By the register SSAR, the items of data required for the operation of the storage units, such as data concerning the store selection, concerning the store operations code, concerning the store operation mode etc are output. By the register AdAR is output the store address and via the register WAR is output the store word. The word input register WER is provided for the transfer of the read-out store word. In addition to the information lines, there are also provided a number of control lines of which only the lines serving to transmit the signals PSS, PVS and FVS are entered. Details in this respect will be explained hereinbelow.

Comparator circuits VG provided in the storage units SE1 and SE2 and in the input and output code converters ECW and ACW monitor the synchronous operation of the communication controllers UEAS1 and UEAS2. The communication controllers UEAS1 and UEAS2 also contain fault detection circuits which emit a fault signal FA in the event of a fault.

On the detection of a fault in known manner, safeguarding programs, i.e., localization and diagnosis programs, are activated which locate the fault and establish the faulty unit or circuit. At this point, the relevant communication controller can assume the described test state.

The invention is concerned with the problem of increasing the availability of the line termination unit in a program controlled data switching system of this kind. For this purpose it is based on the following conditions:

1. Faults which fundamentally affect the operation of the communication controller are recognized by individual fault detection circuits.

2. A faulty communication controller can be blocked in relation to the fault-free units of the system through the introduction of a determinate test state.

3. The diagnosis of a faulty communication controller or of parts within a communication controller is carried out in conjunction with safeguarding programs; the sequences which are controlled by this means rapidly and accurately locate faults.

An object of the invention is to provide means which will improve the capability for diagnosis faults in systems like that described herein by means of additional circuits in the communication controllers.

In this context, a further object of the invention is to provide means in the communication controller itself by which an accurate description can be formed of any fault which is occurring.

An additional object is to provide an arrangement which includes in the diagnosis all attainable data and information required for the operation of the communication controller, and if possible also for cycles which have already been carried out.

Still another object is to provide means for fault recognition in which the fundamental sequences in the communication controller can be started in program controlled fashion and the result be traced.

SUMMARY OF THE INVENTION

The foregoing and other objects are attained according to the invention in that each communication controller of a line termination unit contains, in addition to the devices provided for handling the cyclic traffic with the central storage units, a fault collection device which receives the individual fault signals, forms a fault word derived therefrom and describing the fault, and which forms fault reaction signals. It also contains a diagnosis routine device which evaluates a diagnosis command read out from a diagnosis zone of the central storage unit, of a safeguarding program.

The diagnosis routine device contains a first decoding device for decoding the operations part of the diagnosis command and for forming first control signals, by means of which in the communication controller, data channels may be switched through between the word output register of the communication controller and the word input register, the fault word register containing the fault word and an intermediately storing cycle buffer store on the other hand. The diagnosis routine device contains a second decoding device which may be activated by a control signal from the first decoding device and which serves to decode the command part of the diagnosis command and to form second control signals. All the control circuits and registers in the communication controller are able to be connected to the word input register under the control of the second control signals for the transfer of the diagnosis command to the word input register.

A fundamental advantage of such an arrangement consists in that it is possible to transfer not only the contents of all the output registers, but also the contents of the intermediately storing cycle buffer store in program controlled fashion into the storage unit.

Through the use of a fault register in which each individual fault is assigned an individual fault trigger stage, it is possible to form a fault word. Thus, very accurate statements concerning the fault are available. The fault word can also be transferred in program controlled fashion into the storage unit.

Furthermore, it is advantageous to include into the diagnosis the data input, data output devices including the associated registers, control units and lines in a so-called data loop in program controlled fashion.

Finally the arrangement also offers the possibility of subjecting all the devices of the communication controller to a function check so that on the basis of a quantity of data a fault can be established very rapidly and very accurately, by analysing the traced results of the individual function checks.

BRIEF DESCRIPTION OF THE DRAWINGS

The principles of the invention will be better understood by reference to the description of a preferred embodiment, given below, and the drawings which are briefly described as follows.

FIG. 7 is a flow diagram showing a few of the processes which take place for the diagnosis of faults in the communication controller.

DETAILED DESCRIPTION OF THE DRAWINGS

Figure 1:
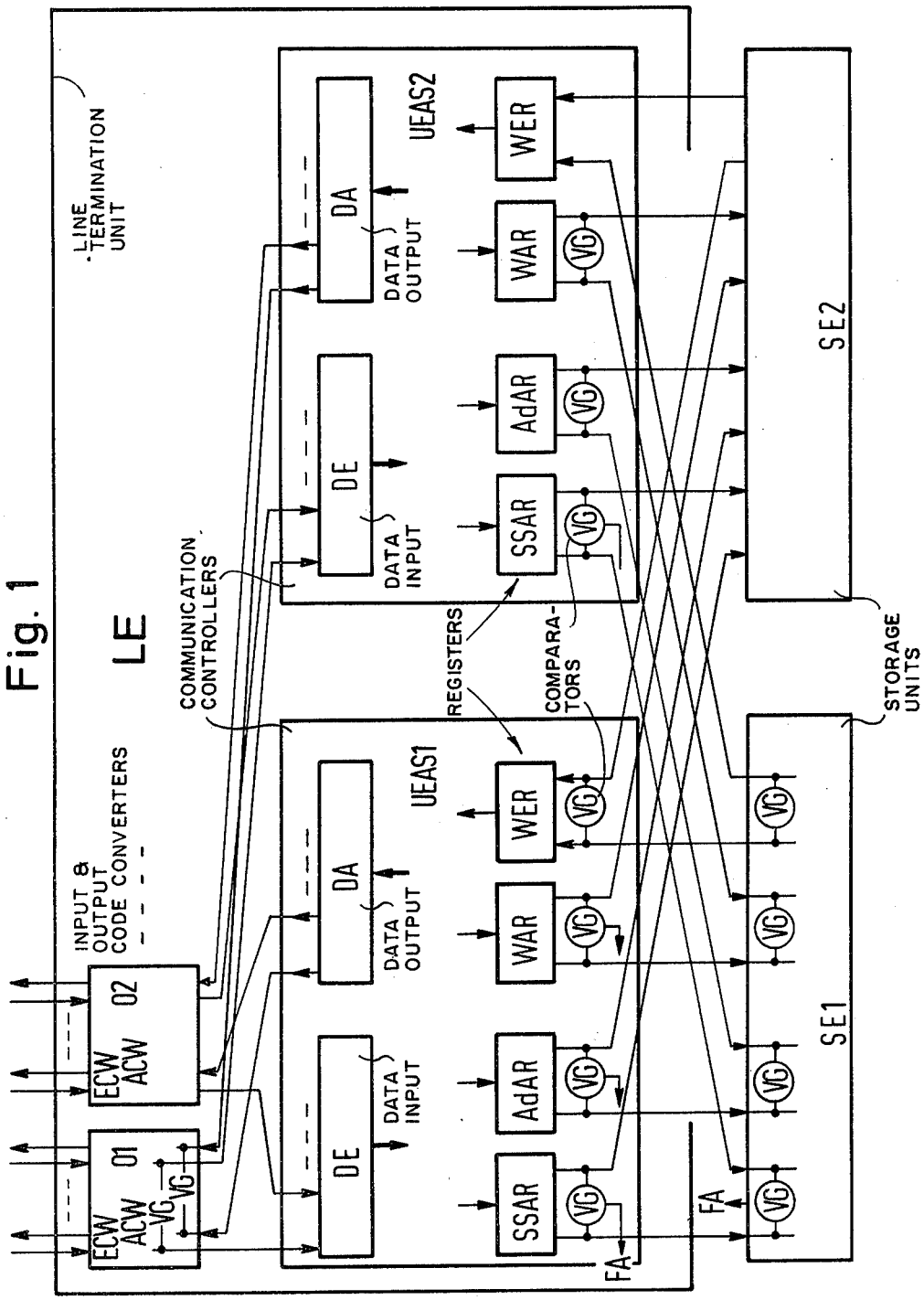
FIG. 1 is a block-schematic diagram of a prior art line transmission unit.
Figure 2:
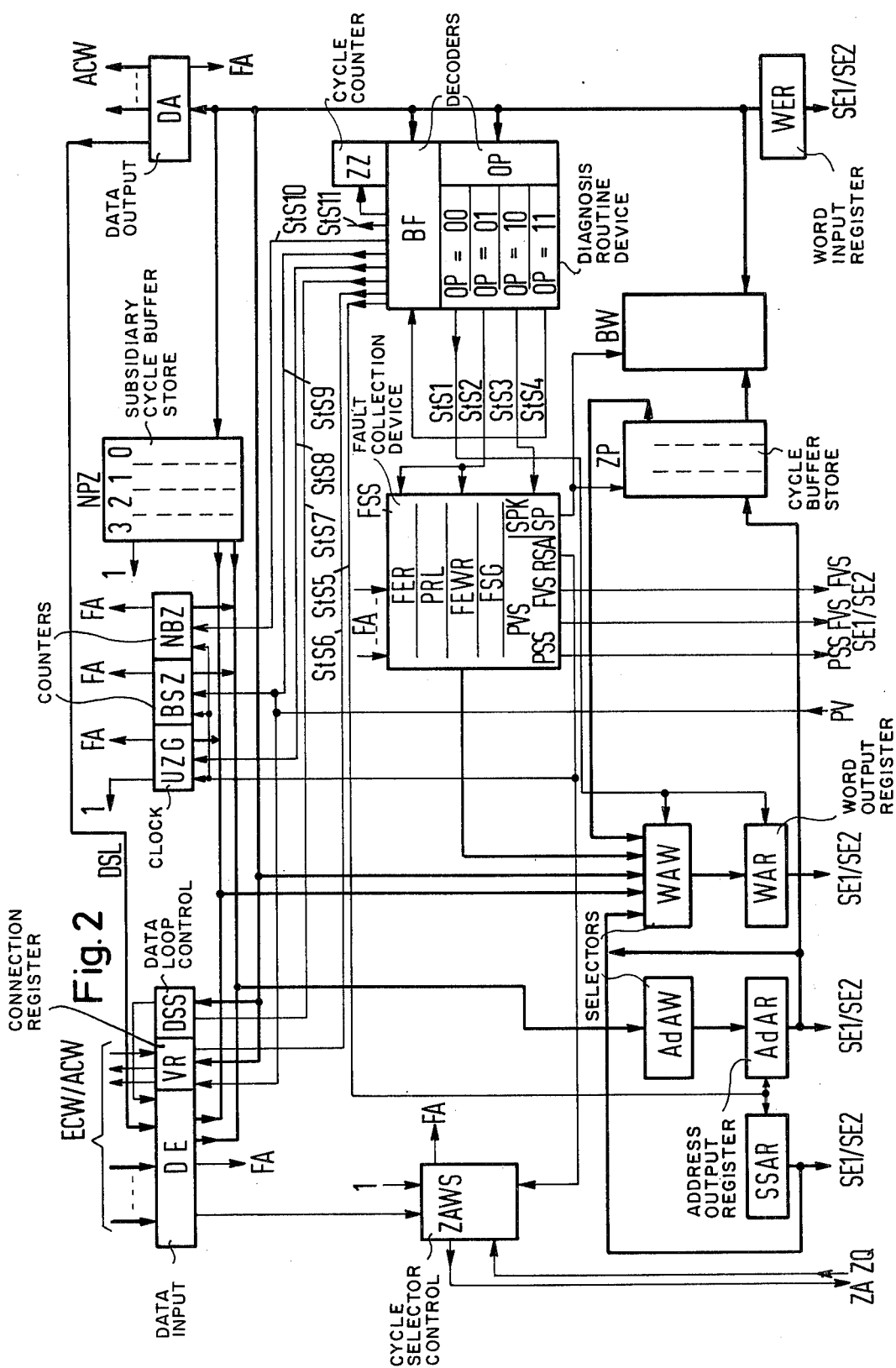
FIG. 2 is a block-schematic diagram of the most fundamental parts of a communication controller with a line termination unit.

FIG. 2 shows only one communication controller UEAS in the details necessary for the understanding of the invention. In practical use, of course, as shown in FIG. 1, a second communication controller of identical construction will be provided. The communication controller UEAS contains the data input and data output devices DE and DA to which are connected the input code converters ECW and the output code converters ACW.

In the direction towards the duplicated central storage units SE1 and SE2 are arranged the output registers for the items of address information and word information AdAR and WAR, as well as the register SSAR. Selector circuits for the items of address information and word information serve to control the transmission of selected data words. These circuits are referenced AdAW and WAW. The selector signals which serve to control the selector circuits are supplied by a cycle selector control unit ZAWS to which each unit in the communication controller which can transfer information to one of or both of the storage units, reports its cycle requests.

As an example, the information channel between the data input DE and the central store will be considered. In this case the data input device DE will, as a result of a request from an input code converter ECW (not shown) transmit a cycle request to the cycle selector control unit ZAWS, where a request signal ZA is coupled to the store. At the same time, the information channels for the item of address information and word information between the data input device DE and the address and word output registers AdAR and WAR are prepared by the selector circuit AdAW and WAW. The information channels are switched through with the cycle allocation signal ZQ which is formed in a central device within the central storage units SE1 and SE2. The information channels between other information transmitters and information receivers within the communication controller are also switched in this way.

The communication controller UEAS also contains the above mentioned intermediate storing devices, namely the cycle buffer store ZP and the subsidiary cycle buffer store NZP. As described in detail in the aforementioned U.S. application Ser. No. 552,796 these are multi-stage shift registers. Where the cycle buffer store accommodates all the essential items of data which are offered to the store, the subsidiary cycle buffer store only receives items of information from the cycle buffer store when these items of data are actually required for further cycles. The cycle buffer store ZP, thus, always contains a series of up-to-date items of information which were required to carry out operations in one of or both of the central storage units.

The communication controllers UEAS contains further control circuits, further information sources and further switching elements for the addressing of specific store zones. Examples of these are a clock UZG and the counters BSZ and NBSZ. All the information sources have access both to the cycle selector control unit and to the address output register and the word output register.

In the direction from the central storage units SE1 and SE2 to the communication controller UEAS is arranged the word input register WER by which the items of information read out from the store pass to the evaluator device BW, to the subsidiary cycle buffer store NZP and to the data output device DA.

In addition to the above mentioned and illustrated data and control lines, a plurality of further data and control lines are also provided. These, however, need not be illustrated or described further for an understanding of this invention.

The devices in the communication controller which, on the occurrence of a fault, support the diagnosis cycles of a safeguarding program, are the fault collection device FSS which is arranged centrally for each communication controller UEAS, the diagnosis routine device DR for the evaluation of diagnosis commands, the control circuit DSS, and the connection register VR, as well as a series of additional data and control signal channels.

The fault collection device FSS contains individually, the fault register FER, which comprises a number of bistable stages FEK0 to FEK63 corresponding to the number of detectable faults, a priority logic circuit PRL, a register FEWR to accommodate a fault word A FEW and a fault reaction circuit FSG for the formation of fault reaction signals. The fault reaction signals PSS, PVS, FVS and RSA are available at the outputs of the fault reaction circuit FSG. The fault collection device FSS is also assigned a blocking trigger stage SPK, by which a further fault reaction signal SP is emitted. The fault reaction signals PSS, PVS, and FSV are emitted by both the central storage units SE1 and SE2. The fault reactions signals RSA and SP serve to control data channels with the communication controller. Therefore, they are referred to as internal fault reaction signals.

The diagnosis routine device DR evaluates the diagnosis command read out from a storage unit. Therefore the device DR may be reached via the word input register WER. In detail it contains first and second decoding devices OP and BF in which the individual bits of the operations and the command section of the diagnosis command are evaluated, and circuits which produce control signals as a result of this evaluation. A cycle counter ZZ which may be set in accordance with the diagnosis command permits the communication controller to carry out a number of cycles before any transfer in the store.

The connection register VR is assigned to the data input device DE. With the aid of this register the connection between the input-output code converters and a faulty communication controller which has been subjected to diagnosis is broken off and, at the end of diagnosis processes, is switched through again.

The control circuit DDS serves to form a data loop DSL between the data output device DA and the data input device DE. Both the control circuit DSS and the connection register VR may be connected to the word input register under the control of the diagnosis routine device DR; this, they may be controlled in programmed fashion with the aid of a diagnosis command.

A few essential sequences will now be described in the following. These sequences are in each case introduced on the recognition of a fault which affects the communication controller. These can be faults which occur in the communication controller itself or at the interfaces by which it is connected to other units.

Figure 3:
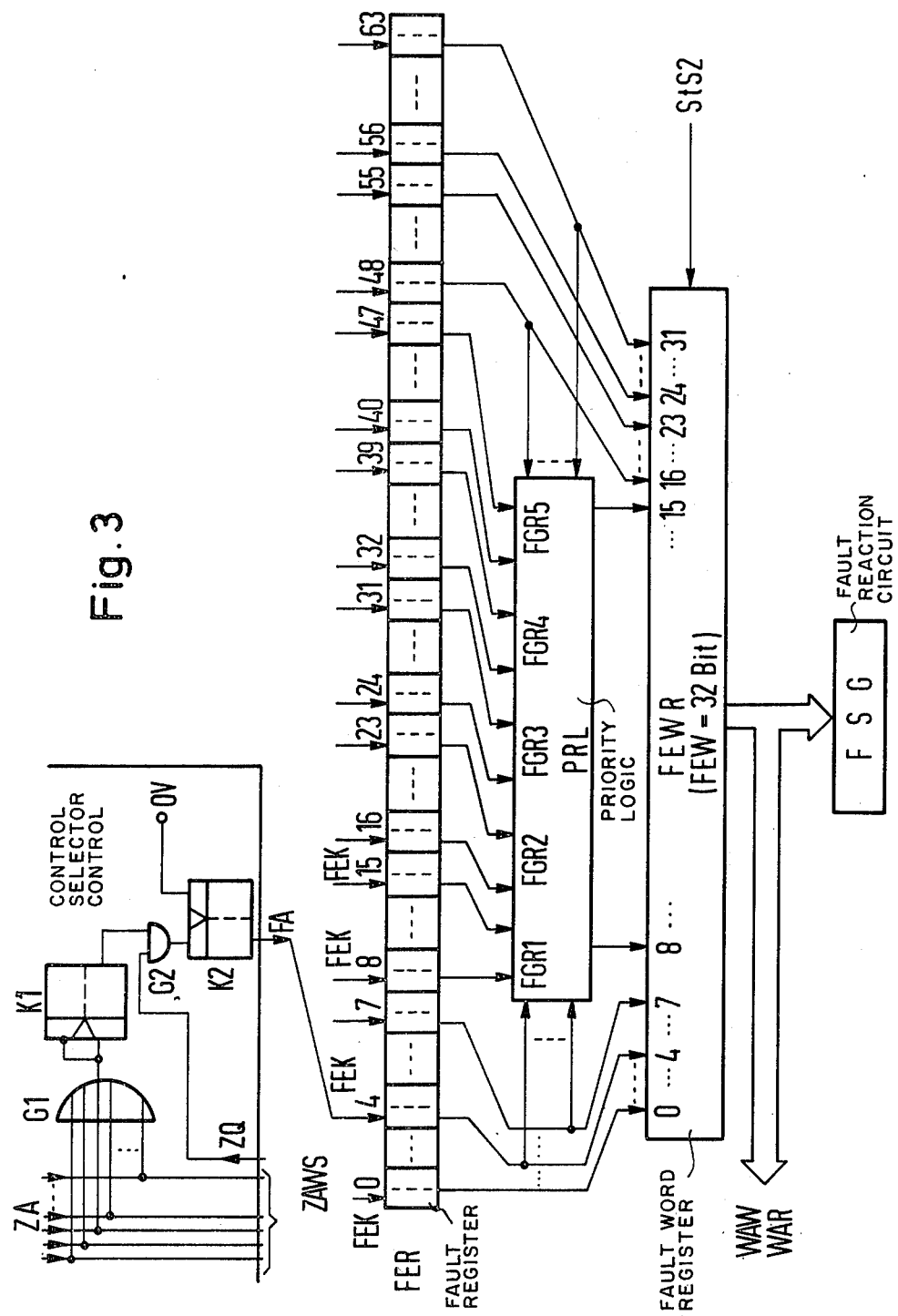
FIG. 3 is a block-schematic diagram of the circuitry used for fault recognition.

The occurrence of a fault is recognized, for example, in that following the transmission of a cycle request no cycle is allocated. A circuit example for the latter case is represented in FIG. 3.

The cycle request signals ZA emanating from the individual data sources in the communication controller UEAS are classified and evaluated in the cycle selector control ZAWS in a manner which has not been shown here, so that in each case only one request is passed on to the central storage unit. The allocation of the requested cycle is confirmed to the cycle selector control by the return of a cycle allocation signal ZQ. By a logic link of the cycle request signals ZA and the cycle acknowledgement signal ZQ, by an OR gate G1 and an AND gate G2, each of which are followed by bistable switching stages K1 and K2, a fault signal FA is emitted, whenever following the transmission of a cycle request signal ZA, no cycle acknowledgement signal ZQ arrives or when a cycle allocation signal ZQ arrives without a cycle request signal having been previously transmitted.

The fault signal FA is coupled to a specific input of the fault collection device FSS. In this device the fault trigger stage which is assigned to this fault signal, in this example the fault trigger FEK4 in the fault register FER, is set. In other fault recognition circuits which are not shown in detail, a monitoring operation is carried out on further circuits which participate in the cycle selection and which, by means of fault signals, set further fault trigger stages e.g. the fault trigger stage FEK8 to FEK15. The state of the fault trigger stages in the fault register FER thus represents sufficiently accurate information on the fault.

Figure 4:
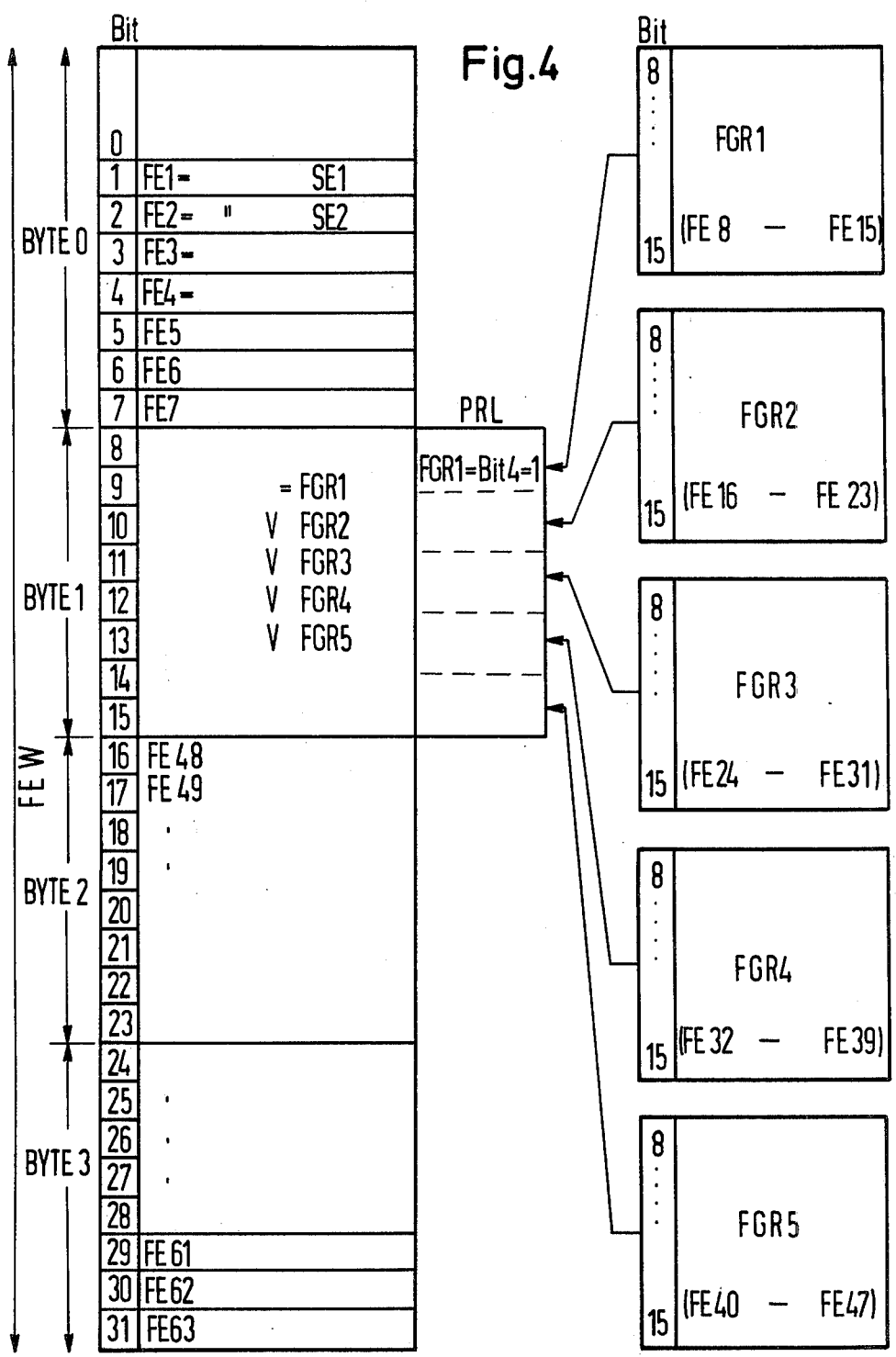
FIG. 4 is a diagram illustrating the operations carried out by the FIG. 3 circuitry.

As a stored word can comprise only 32 bits, a 32-bit word must be formed from the state of the fault register FER, which comprises 64 trigger stages, by a priority logic circuit PRL. This word is referred to as fault word FEW. It is possible to permanently assign a specific part of the fault word to specific faults, while providing that another part of the fault word is variable. That is, it is possible to provide more accurate statements concerning the nature of items of information contained in other parts of the fault word. For example, the bits 8 to 15 in the variable section can in each case have a different significance in dependence upon specific bits within the fixed parts of the fault word. A list of the faults which occur in a program controlled data switching system, and the assignment thereof to the individual bits of a fault word composed of 32 bits is given in FIG. 4, on the left hand of which is shown the fault word FEW comprising 32 bits. In FIG. 4, e.g., the fault FE1 characterized by the set bit 1 means that the interface output of the communication controller in question is blocked.

The bits 8 to 15 (byte 1) of the fault word can be loaded with five fault groups FGR1 to FGR5. The fault group FGR1, e.g., is transferred into the fault word FEW when bit 4 is set. In this case in the bits 8 to 15 the fault word FEW contain more precise details concerning the nature of the fault FE4. Similarly, the fault groups FGR2 to FGR5 are transferred as byte 1 on the occurrence of specific faults within the permanently assigned sections of the fault word FEW. In this case the priority logic PRL controls the selection if a plurality of faults, each of which are assigned fault groups, occur simultaneously.

The fault word is made available by the fault word register FEWR and by 32 lines of the fault reaction circuit FSG. The fault reaction signals are formed in accordance with a given assignment. These are the fault reaction signals PSS, PVS and FVS which pass by interface lines to the storage units SE1 and SE2. These fault reaction signals are in a known manner (not shown) evaluated in the central control devices of the storage units in such manner that the communication controller transmitting the fault reaction signals PVS, or if the fault reaction signal PSS is also transmitted, the storage units are set in the test state. These operations can also occur simultaneously, i.e., both the communication controller UEAS and the storage units can assume the test state. As a result of the transmission of the fault reaction signal FVS, the fault state is centrally registered, and the start of the safeguarding program is commenced. Detail in this respect will be found, for example, in U.S. Pat. No. 3,818,199.

Faults which can cause adulteration of information always lead both to the formation of the fault reaction signals PSS, PVS and FVS and to the formation of the fault reaction signal SP which is not transmitted to the store. This fault reaction signal SP sets a blocking trigger stage SPK, by the output of which the shift process in the cycle buffer store ZP, the evaluation process in the evaluator device BW and the cycle selection in the cycle selector control ZAWS are blocked. Thus, the essential data of the previous sequences are retained. Finally with the fault reaction signal RSA all the control circuits in the communication controller are reset.

It will now be assumed that the fault reaction signal PVS has been transmitted over the interface lines to the two storage units SE1 and SE2, where it has been evaluated in a program request register and this has led to the communication controller UEAS assuming the test state. This is carried out, as stated in U.S. Pat. No. 3,813,648 in that in a central control unit of the system an item of information concerning the test state of the communication controller is formed. This item of information is always taken into account in the distribution of requests from and for the communication controller. The communication controller UEAS is informed of this state by the sending back of a signal PV.

Figure 5:
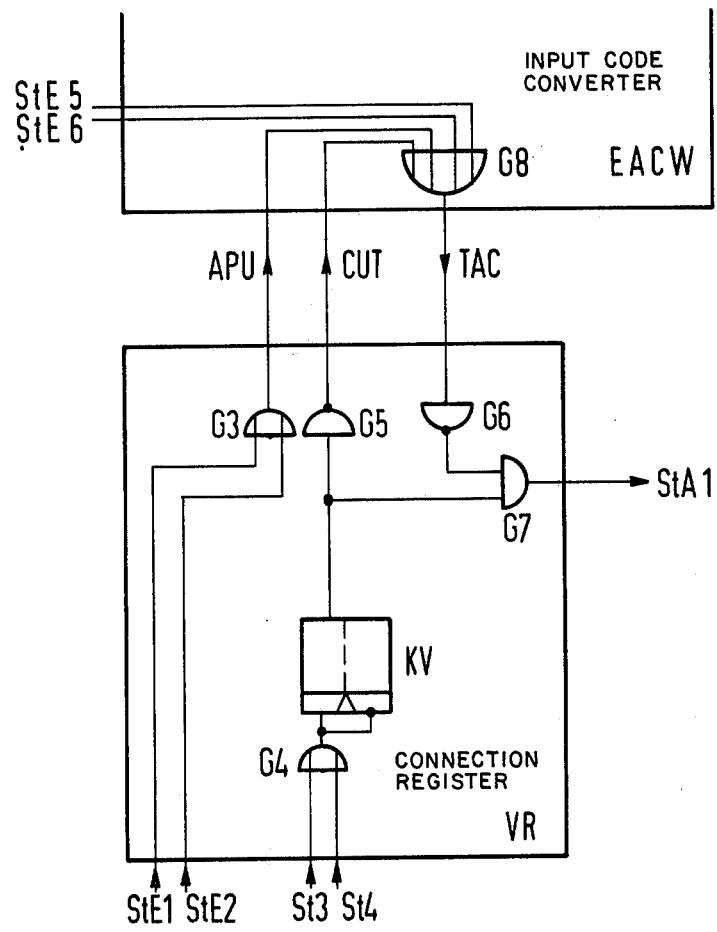
FIG. 5 is a schematic diagram showing an example for the connection and disconnection of an input-output code converter to a communication controller.

Prior to and during a diagnosis process, it is necessary to break the connection to the input and output code converters ECW and ACW. This takes place by an evaluation of the returned signal PV in the connection register VR of the faulty communication controller. As shown by the circuit in FIG. 5, the connection register VR is in each case assigned to an input and output code converter circuit ECW and ACW and is connected to the latter by 3 control lines. The corresponding control signals APU, CUT and TAC signal a switched through (APU=0; CUT=0; TAC=0) connection or a broken connection (APU=1; or CUT=1; TAC=1) between the communication controller UEAS and the relevant input and output code converter circuit.

For the formation and evaluation of these control signals, the connection register VR contains the gates G3 to G7 and a bistable trigger stage KV. The gate G8 is contained in the input-output code converter EACW. The gates G3, G4, and G8 each possess a plurality of control inputs StE1, StE2, StE3, StE4 and StE5, StE6. Gate G7 forms a control output StA1 at which a signal is emitted only when the connection is switched through between the communication on controller UEAS and the input-output code converter EACW.

It will be seen that the foregoing is the case only when no signal is present at either of the control inputs StE1 and StE2, when at the same time the trigger stage KV is set by one of the control inputs StE3, StE4, and when also there is no signal at the control inputs StE5 and StE6. The control inputs StE1 and StE2 are in each case connected to the control lines by which the break signals are transmitted e.g. the signal PV. The control inputs StE5 and StE6 can be activated, e.g., in the event of the breakdown of the current supply in an input-output code converter EACW. The control inputs StE3 and StE4 are in each case connected to those control lines by which a connection signal is transmitted.

The evaluation of the fault reaction signal FVS leads, in the central storage unit, to the activation of a safeguarding program.

As is generally known, within the scope of such a program diagnostic instructions are sent to the unit transmitting the error signal. To this end, in the manner which is well known to those skilled in the art and under the control of a program control unit the diagnostic instructions held in one region of the central storage are transferred to a storage cell permanently allocated to the faulty unit and which can only be read from that unit. This cell will hereinafter be referred to as a diagnosis start cell. In this example, the diagnostic start cell is contained either in central storage SE1 or SE2. Whereas in prior art structures a multitude of instructions are necessary for the diagnosis operation, the arrangement in accordance with the principles of this invention makes possible that the diagnosis start cell hold only instructions for four basic routines. This means that the operation part of the instruction comprises only two bits. Depending on the interpretation of the operation part and on the contents of the other bits of the instruction, which comprises a total of 32 bits depending on the contents of the diagnosis start cell, all essential circuit elements in the communication sequence control UEAS can be checked without further details of the diagnostic routine. This is possible because additional circuits are provided therein in accordance with the invention which are governed by the control signals of the diagnostic routine unit DR. With the reading of the diagnosis start cell the entire contents, i.e., all 32 bits of the diagnostic instruction or all the data in the word input register WER necessary for the communication sequence control UEAS are available for the communication sequence control.

Figure 6:
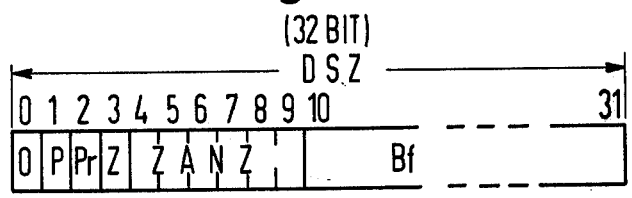
FIG. 6 shows the format of a diagnosis command.

The contents of the diagnosis start cell comprise within an operations section OP (2 bits), 2 bits (OP) concerning the mode of operation, 1 bit (Pr) concerning a tracing mode Pr and 1 bit (Z) concerning a cycle counting process. If the Z-bit is 1 an additional six bits, containing an information ZANZ are provided for the loading of the cycle counter ZZ. Finally additional items of information concerning the nature and the location of one or more than one sequence which is to be executed, are contained in the diagnosis start cell. The format of a diagnosis command contained in the diagnosis start cell is shown in FIG. 6. Reference is made to the flow diagram shown in FIG. 7 in explanation of the sequences which take place as a result of the contents of the diagnosis start cell in the communication controller under the control of the diagnosis routine device DR.

The left upper section of FIG. 7 shows that the communication controller is in the test state (UEAS=P), that corresponding zones in a storage unit are likewise in the test state (SE=P) and that the communication controller is connected to the relevant storage unit (SE-UEAS). If these conditions are fulfilled, the diagnosis process is started (DR-Start). For the sake of completeness, it will also be stated that the resetting of the control units must be started (RSA start) and ended (RSA end) in the communication controller which is to be diagnosed. The fact that the diagnosis routine circuit DR must be ready for operation is not specifically represented in FIG. 7. The control circuits for the tracing and for the cycle counter circuit have been brought into a starting position with the signal RSA. At this point, the contents of the diagnosis start cell are read out (DSZ) and evaluated in the first decoding device OP. The following basic sequences are possible on the basis of the two bits which represent the operation section OP of the diagnosis command:

| INPUT | | | | | OUTPUT |
| --- | --- | --- | --- | --- | --- |
| O | P | StS1 | StS2 | StS3 | StS4 |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

The interpretation of the two bits in the operation portion of the instruction occurs in the first decoder OP of the diagnostic routine circuit DR which has a single gate circuit for this purpose. It can readily be seen that in this way four basic routines are intended in the communication sequence control unit UEAS which will be described in detail below.

The second decoder BF to be activated with the control signal StS4 is an instruction decoder which converts the data received as instructions into signals and distributes then to specified circuit elements in the communication sequence control. Such circuits are known and are fully disclosed in the prior art. An example of such a circuit which can be used in conjunction with the apparatus described herein is described in greater detail in U.S. Pat. No. 3,409,877 wherein the circuit in question is referred to as a "maintenance control translator".

For the state OP=00 the contents of the diagnosis start cell are conducted by the word input register WER directly into the word output register WAR of the communication controller UEAS (WER=WAR) and written into a diagnosis tracing cell in the central store (WAR=DPZ). In the circuit shown in FIG. 2, this takes place with the control signal StS1.

For the state OP=01 the contents of the fault register FER in the fault collection stage FSS is output in the form of the fault word FEW (fault word output FEWA), and is loaded into the word output register WAR (FEWR=WAR) from where it is written into the diagnosis tracing cell (WAR=DPZ). The fault register is erased (FER reset). In the circuit shown in FIG. 2 this is carried out with the control signal StS2 (StS2=1).

For the state OP=10 the blocking trigger stage SPK in the fault collection device FSS is reset by the control signal StS3 (StS3=1) (FIG. 2). This discontinues the block for the evaluator circuit BW and for a shift process in the cycle buffer store. The cycle buffer store itself is reset (ZP/BW unblock; ZP reset).

Whereas the above described three sequences serve to provide a sufficient quantity of data for the determination of the nature and the location of the fault at a central point, whereby the inclusion of the cycle buffer store also provides data concerning already completed sequences, the fourth operations mode which will be described in the following serves to introduce individual sequences in the communication controller for a program controlled function check on all the essential circuits in the communication controller. The results which are thus produced enable an accurate fault diagnosis to be rapidly set up.

For the state OP=11 the bits 2 through 31 of the diagnosis command are interpreted, i.e., the content of the diagnosis start cell is interpreted, as a so-called direct command for the communication controller, which leads, by delivering the control signal StS4, (StS4=1) to the connection of the second decoding device BF in the diagnosis routine device DR. In this case an analysis is carried out both of the P-bit and of the Z-bit in the command section of the diagnosis command. With Pr=0, the item of information contained in the word output register WAR and with Pr=1 the item of information contained in the register SSAR having been reloaded into the word output register are transferred into the diagnosis tracing cell. The Z-bit has the significance that the information ZANZ (bits 4 to 9) is used to set the cycle counter ZZ. It is thus possible to provide a maximum of $2^6 = 64$ store cycles before a tracing cycle is carried out i.e. the data is not transferred into the diagnosis tracing cell until a given number of cycles have taken place.

This process corresponds to the right-hand section of the flow diagram in FIG. 7, in which DB marks the diagnosis command which is interpreted as a direct command which must be carried out after the decoding process. The cycle counter ZZ here is in each case reduced by 1 (ZZ:−1) until it reaches the count of 0 (ZZ=0). In this case the tracing is prepared (PRT VORB). If the bit P=0 with the next cycle the contents of the word output register WAR is transferred into the diagnosis tracing cell. If P=1, the contents of the register SSAR is, after reloading into the word output register WAR (SSAR=WAR), transferred into the diagnosis tracing cell (WAR=DPZ).

Following the transfer of the contents of the word output register WAR into the diagnosis tracing cell, the circuits serving to evaluate the P-bit and the Z-bit, thus the bistable stages provided for this purpose in the diagnosis routine device are reset. The resetting signal RSA for all the other control units in the communication controller is emitted anew, so that the same starting conditions prevail for a possibly following second diagnosis command.

As a result of the evaluation of the diagnosis command as direct command for the communication controller, all the essential sequences can be started therein in program controlled fashion. A few sequences will be discussed in detail in the following.

One of these sequences loads to the formation of the data output-data input loop. This sequence is of significance because it is thereby possible to include in a function check the circuits of the data input and output devices DE and DA which are normally used only for items of information between the communication controller and the input and output code converters.

For this purpose the diagnosis command which is interpreted as direct command contains an item of information which, together with an address for a connection circuit, is passed to the data output device DA. At the same time the control unit DSS is activated. This takes place with the control signal StS7 which is formed in the diagnosis routine device DR by decoding the corresponding section of the command. For the data input device DE the item of information transferred over the data loop corresponds to an item of information which is normally offered by an input code converter. All the sequences which are triggered with the request from an input code converter are thus introduced.

Another important sequence in this context is the sequence "transfer and shift cycle buffer". With the fault reaction signal SP the cycle buffer store in the communication controller has been isolated in that its shift operation has been blocked. It is thus ensured that the items of information of the last operating cycles for which the communication controller had access to the central storage units, are stored. With the aid of a diagnosis command which is decoded in the described manner as direct command for the sequence "transfer and shift of the cycle buffer store" in the diagnosis routine device DR, it is possible to control the discontinuation of the blockage of the cycle buffer store by resetting the blocking trigger stage SPK in the fault collection device FSS, a shift operation being simultaneously carried out. The items of data contained in the stage O of the cycle buffer store are thus transferred into the word output register WAR and having been restored in the diagnosis tracing cell are available to the central safeguarding program as information concerning the last sequences in the communication controller for further processing.

By means of further diagnosis commands, interpreted as direct commands, the connection registers and all other essential registers can be loaded in program controlled fashion and the contents thereof traced.

The preferred embodiment of the invention described hereinabove is intended only to be exemplary of the principles of the invention. It is contemplated that the described embodiment can be modified or changed in a variety of ways while remaining within the scope of the invention as defined by the appended claims.

We claim:

1. Apparatus for monitoring fault diagnosis operations in a communications controller of a line termination unit in a program controlled data switching center, wherein each said line termination unit includes data input and output devices connecting said line termination unit to transmission lines, word input and output registers for transferring data to and receiving data from a central storage and error detecting means in communication with said central storage for transmitting, responsive to a fault in said communications controller, an error signal to said central storage thereby initiating the operation of a safeguarding routine, comprising:

fault collection means for receiving error signals, registering a fault word describing the error which has occurred and generating first fault signals for communication to said communications controller and second fault signals for communication to said central storage, diagnostic routine means in said communication controller and including a first decoding means coupled to a said word input register for receiving diagnosis commands issued responsive to said safeguarding routine and for generating, responsive thereto, first control signals and including second decoding means for operating responsive to said first control signal for decoding said diagnosis commands and producing corresponding second control signals, intermediate buffer storage means in said communication controller, first means for connecting, responsive to said first control signals, to said input word register, said fault word register and said intermediate buffer storage means to said word output register, and second means for connecting, responsive to said second control signals, components of said communication controller individually to a said word input register for accepting further instructions and to a said word output register for transferring information to said central storage.

2. The apparatus defined in claim 1 further comprising a priority logic circuit and wherein said fault collection means includes a fault register in which each individual fault is assigned a given bistable stage, outputs of one part of said bistable stages being connected to inputs of said fault word register, outputs of a second part of said bistable stages being combined to form fault groups and connected to said priority logic circuit whereby only the bistable stages of one fault group are connected to said fault word register at a time.

3. The apparatus defined in claim 2 wherein said system includes a cycle selector control and an evaluator circuit and wherein said fault collection means includes a fault reaction circuit and blocking switching means, said fault reaction circuit being constructed to simultaneously emit said second fault signals for transmission to said central storage and a first internal fault reaction signal for resetting said control units in said communications controller, said blocking switching means being constructed to produce a second internal fault reaction signal which causes the blocking of said cycle selector control, and said intermediate buffer store from further operations.

4. The apparatus defined in claim 3 wherein said first control signals are connected to control the transfer of information contained in said word input register and in said fault word register and, by operation of said blocking switching means, to control the transfer of information contained in said intermediate store to said word output register, the contents of said word output register being transferred to said central storage for tracing purposes.

5. The apparatus defined in claim 3 wherein said second decoding means is connected to said word input register, responsive to a said first control signal formed in said first decoding means, for evaluating the diagnosis command as an individual sequence command for said communication controller, one of said second control signals being transmitted to said control units and registers of said communication controller, predetermined ones of said registers and control units being connected to said word input register for the transfer of the sequence command.

6. The apparatus defined in claim 4 further comprising:

data input and output devices in said communication controller connected by an additional data line.

control means connected to said word input register, responsive to a said second control signals, for receiving a sequence command and connected to said data input device, responsive to the evaluation of the sequence command of the data output device.

7. The apparatus defined in claim 6 further comprising:

cycle counter means in said second decoding means which is settable on the basis of an item of information contained in said diagnosis command for determining the number of individual sequences and wherein said word output register is connected to said central storage when said cycle counter has been reset.

* * * * *